United States Patent
Yun et al.

(10) Patent No.: US 9,998,301 B2
(45) Date of Patent: Jun. 12, 2018

(54) SIGNAL ISOLATOR SYSTEM WITH PROTECTION FOR COMMON MODE TRANSIENTS

(71) Applicant: Analog Devices, Inc., Norwood, MA (US)

(72) Inventors: Ruida Yun, Weston, MA (US); Baoxing Chen, Westford, MA (US)

(73) Assignee: Analog Devices, Inc., Norwood, MA (US)

(*) Notice: Subject to any disclaimer, the term of this patent is extended or adjusted under 35 U.S.C. 154(b) by 364 days.

(21) Appl. No.: 14/531,141

(22) Filed: Nov. 3, 2014

(65) Prior Publication Data
US 2016/0126724 A1 May 5, 2016

(51) Int. Cl.
H02H 3/22 (2006.01)
H04L 25/02 (2006.01)

(52) U.S. Cl.
CPC ...... *H04L 25/0276* (2013.01); *H04L 25/0266* (2013.01)

(58) Field of Classification Search
USPC .......................................................... 361/111
See application file for complete search history.

(56) References Cited

U.S. PATENT DOCUMENTS

| | | |
|---|---|---|
| 3,058,078 A | 10/1962 | Hoh |
| 3,537,022 A | 10/1970 | Regan |
| 3,714,540 A | 1/1973 | Galloway |
| 3,760,198 A | 9/1973 | Mori et al. |
| 3,798,608 A | 3/1974 | Huebner |
| 3,808,673 A | 5/1974 | Bottini |
| 4,024,452 A | 5/1977 | Seidel |
| 4,027,152 A | 5/1977 | Brown et al. |
| 4,035,710 A | 7/1977 | Joyce |
| 4,065,713 A | 12/1977 | Pollmeier |
| 4,118,603 A | 10/1978 | Kumhyr |
| 4,159,431 A | 6/1979 | Roozenbeek et al. |
| 4,227,045 A | 10/1980 | Chelcun et al. |

(Continued)

FOREIGN PATENT DOCUMENTS

| | | |
|---|---|---|
| CN | 101681901 A | 3/2010 |
| CN | 201976007 U | 9/2011 |

(Continued)

OTHER PUBLICATIONS

Office communication dated Oct. 7, 2016 for Application No. JP 2015-215569.

(Continued)

*Primary Examiner* — Ronald W Leja
(74) *Attorney, Agent, or Firm* — Wolf, Greenfield & Sacks, P.C.

(57) ABSTRACT

An isolator system has an isolator that generates differential isolator signals and a receiver that generates digital data representative of signals received from the isolator. The system also may include an RC filter coupled between the isolator and the receiver. During operation, the filter may distribute transient signals across various circuit paths in the isolator, only some of which are coupled to the receiver inputs. Over time, the filter may attenuate transient contributions at the receiver inputs. In this manner, the filter may limit effects of these common mode transients.

19 Claims, 3 Drawing Sheets

(56) References Cited

U.S. PATENT DOCUMENTS

| | | | |
|---|---|---|---|
| 4,275,404 A | 6/1981 | Cassiday et al. | |
| 4,302,807 A | 11/1981 | Mentler | |
| 4,318,170 A | 3/1982 | Cabalfin | |
| 4,321,487 A | 3/1982 | Huykman | |
| 4,352,998 A | 10/1982 | Baker et al. | |
| 4,443,839 A | 4/1984 | Onodera et al. | |
| 4,475,149 A | 10/1984 | Gallios | |
| 4,538,136 A | 8/1985 | Drabing | |
| 4,547,961 A | 10/1985 | Bokil et al. | |
| 4,554,462 A | 11/1985 | Komiya et al. | |
| 4,564,768 A | 1/1986 | Komiya et al. | |
| 4,660,014 A | 4/1987 | Wenaas et al. | |
| 4,703,283 A | 10/1987 | Samuels | |
| 4,712,170 A | 12/1987 | Grace | |
| 4,720,667 A | 1/1988 | Lee et al. | |
| 4,748,419 A | 5/1988 | Somerville | |
| 4,780,795 A | 10/1988 | Meinel | |
| 4,785,345 A | 11/1988 | Rawls et al. | |
| 4,817,865 A | 4/1989 | Wray | |
| 4,818,855 A | 4/1989 | Mongeon et al. | |
| 4,825,450 A | 4/1989 | Herzog | |
| 4,835,486 A | 5/1989 | Somerville | |
| 4,845,466 A | 7/1989 | Hariton et al. | |
| 4,859,877 A | 8/1989 | Cooperman et al. | |
| 4,864,589 A | 9/1989 | Endo | |
| 4,885,582 A | 12/1989 | LaBarge et al. | |
| 4,912,617 A | 3/1990 | Hartmann et al. | |
| 4,920,474 A | 4/1990 | Bruning et al. | |
| 4,922,883 A | 5/1990 | Iwasaki | |
| 4,924,210 A | 5/1990 | Matsui et al. | |
| 4,937,468 A | 6/1990 | Shekhawat et al. | |
| 4,945,264 A | 7/1990 | Lee et al. | |
| 4,959,631 A | 9/1990 | Hasegawa et al. | |
| 5,041,780 A | 8/1991 | Rippel | |
| 5,057,968 A | 10/1991 | Morrison | |
| 5,095,357 A | 3/1992 | Andoh et al. | |
| 5,102,040 A | 4/1992 | Harvey | |
| 5,128,729 A | 7/1992 | Alonas et al. | |
| 5,136,455 A | 8/1992 | Billingsley | |
| 5,142,432 A | 8/1992 | Schneider | |
| 5,164,621 A | 11/1992 | Miyamoto | |
| 5,204,551 A | 4/1993 | Bjornholt | |
| 5,235,425 A | 8/1993 | Oh | |
| 5,260,967 A | 11/1993 | Schilling | |
| 5,270,882 A | 12/1993 | Jove et al. | |
| 5,293,400 A | 3/1994 | Monod et al. | |
| 5,300,896 A * | 4/1994 | Suesserman | H03F 3/45475 330/260 |
| 5,325,355 A | 6/1994 | Oprescu et al. | |
| 5,327,030 A | 7/1994 | DeVito et al. | |
| 5,329,225 A | 7/1994 | Roshen et al. | |
| 5,334,882 A | 8/1994 | Ting | |
| 5,339,061 A | 8/1994 | Reick | |
| 5,353,001 A | 10/1994 | Meinel et al. | |
| 5,369,666 A | 11/1994 | Folwell et al. | |
| 5,384,808 A | 1/1995 | Van Brunt et al. | |
| 5,394,319 A | 2/1995 | Attwood et al. | |
| 5,396,394 A | 3/1995 | Gee | |
| 5,430,641 A | 7/1995 | Kates | |
| 5,450,305 A | 9/1995 | Boys et al. | |
| 5,467,607 A | 11/1995 | Harvey | |
| 5,469,098 A | 11/1995 | Johnson, Jr. | |
| 5,475,579 A | 12/1995 | John et al. | |
| 5,484,012 A | 1/1996 | Hiratsuka | |
| 5,488,627 A | 1/1996 | Hardin et al. | |
| 5,533,054 A | 7/1996 | DeAndrea et al. | |
| 5,539,241 A | 7/1996 | Abidi et al. | |
| 5,539,598 A | 7/1996 | Denison et al. | |
| 5,572,179 A | 11/1996 | Ito et al. | |
| 5,588,021 A | 12/1996 | Hunt et al. | |
| 5,596,466 A | 1/1997 | Ochi | |
| 5,631,920 A | 5/1997 | Hardin | |
| 5,636,110 A | 6/1997 | Lanni | |
| 5,650,357 A | 7/1997 | Dobkin et al. | |
| 5,663,768 A | 9/1997 | Yang | |
| 5,701,037 A | 12/1997 | Weber et al. | |
| 5,714,938 A | 2/1998 | Schwabl | |
| 5,716,323 A | 2/1998 | Lee | |
| 5,731,954 A | 3/1998 | Cheon | |
| 5,757,338 A | 5/1998 | Bassetti et al. | |
| 5,774,350 A | 6/1998 | Notaro et al. | |
| 5,774,791 A | 6/1998 | Strohallen et al. | |
| 5,781,071 A | 7/1998 | Kusunoki | |
| 5,781,077 A | 7/1998 | Leitch et al. | |
| 5,786,979 A | 7/1998 | Douglass | |
| 5,801,602 A | 9/1998 | Fawal et al. | |
| 5,812,598 A | 9/1998 | Sharma et al. | |
| 5,825,259 A | 10/1998 | Harpham | |
| 5,831,426 A | 11/1998 | Black, Jr. et al. | |
| 5,831,525 A | 11/1998 | Harvey | |
| 5,877,667 A | 3/1999 | Wollesen | |
| 5,900,683 A | 5/1999 | Rinehart et al. | |
| 5,900,764 A | 5/1999 | Imam et al. | |
| 5,907,481 A | 5/1999 | Svardsjo | |
| 5,910,780 A | 6/1999 | Tam | |
| 5,913,817 A | 6/1999 | Lee | |
| 5,926,358 A | 7/1999 | Dobkin et al. | |
| 5,942,937 A | 8/1999 | Bell | |
| 5,952,849 A | 9/1999 | Haigh | |
| 5,959,482 A | 9/1999 | Fattori et al. | |
| 5,969,590 A | 10/1999 | Gutierrez | |
| 5,990,753 A | 11/1999 | Danstrom et al. | |
| 5,998,979 A | 12/1999 | Nilsson | |
| 6,000,128 A | 12/1999 | Umeno et al. | |
| 6,016,050 A | 1/2000 | Brokaw | |
| 6,025,705 A | 2/2000 | Nguyen et al. | |
| 6,038,276 A | 3/2000 | Dinh | |
| 6,040,986 A | 3/2000 | Sakamoto et al. | |
| 6,049,258 A | 4/2000 | Fawal et al. | |
| 6,054,780 A | 4/2000 | Haigh et al. | |
| 6,069,802 A | 5/2000 | Priegnitz | |
| 6,087,882 A | 7/2000 | Chen et al. | |
| 6,104,003 A | 8/2000 | Jones | |
| 6,124,756 A | 9/2000 | Yaklin et al. | |
| 6,208,174 B1 | 3/2001 | Hopkins | |
| 6,208,531 B1 | 3/2001 | Vinciarelli et al. | |
| 6,229,346 B1 | 5/2001 | Milanese et al. | |
| 6,249,171 B1 | 6/2001 | Yaklin et al. | |
| 6,255,863 B1 | 7/2001 | Yamauchi et al. | |
| 6,262,600 B1 | 7/2001 | Haigh et al. | |
| 6,266,254 B1 | 7/2001 | Ohtake | |
| 6,291,907 B1 | 9/2001 | Haigh et al. | |
| 6,300,617 B1 | 10/2001 | Daughton et al. | |
| 6,304,109 B1 | 10/2001 | Brokaw | |
| 6,317,338 B1 | 11/2001 | Boys | |
| 6,344,979 B1 | 2/2002 | Huang et al. | |
| 6,359,983 B1 | 3/2002 | Krone et al. | |
| 6,377,313 B1 | 4/2002 | Yang et al. | |
| 6,377,646 B1 | 4/2002 | Sha | |
| 6,389,063 B1 | 5/2002 | Kanekawa et al. | |
| 6,400,227 B1 | 6/2002 | Goldfarb et al. | |
| 6,420,992 B1 | 7/2002 | Richmond | |
| 6,449,318 B1 | 9/2002 | Rumbaugh | |
| 6,501,363 B1 | 12/2002 | Hwu et al. | |
| 6,504,732 B2 | 1/2003 | Abe | |
| 6,525,566 B2 | 2/2003 | Haigh et al. | |
| 6,538,532 B2 | 3/2003 | Petrovic | |
| 6,542,385 B1 | 4/2003 | Emmons et al. | |
| 6,553,057 B1 | 4/2003 | Sha et al. | |
| 6,556,075 B1 | 4/2003 | Jordan | |
| 6,570,522 B1 | 5/2003 | Galambos et al. | |
| 6,573,940 B1 | 6/2003 | Yang | |
| 6,603,383 B2 | 8/2003 | Gevorgian et al. | |
| 6,603,807 B1 | 8/2003 | Yukutake et al. | |
| 6,606,260 B2 | 8/2003 | Ahlstrom | |
| 6,611,051 B2 | 8/2003 | Akiyama et al. | |
| 6,621,365 B1 | 9/2003 | Hallivuori et al. | |
| 6,686,768 B2 | 2/2004 | Comer | |
| 6,693,458 B1 | 2/2004 | Barrow | |
| 6,720,816 B2 | 4/2004 | Strzalkowski | |
| 6,728,320 B1 | 4/2004 | Khasnis et al. | |
| 6,738,240 B1 | 5/2004 | Ahn et al. | |
| 6,747,421 B2 | 6/2004 | Kohn | |
| 6,765,809 B2 | 7/2004 | Komori | |

(56) References Cited

U.S. PATENT DOCUMENTS

| | | | |
|---|---|---|---|
| 6,807,070 B2 | 10/2004 | Ribarich | |
| 6,819,169 B1* | 11/2004 | Kunc | H04L 25/0266 327/560 |
| 6,833,875 B1 | 12/2004 | Yang et al. | |
| 6,873,065 B2 | 3/2005 | Haigh et al. | |
| 6,903,578 B2 | 6/2005 | Haigh et al. | |
| 6,911,848 B2 | 6/2005 | Vinciarelli | |
| 6,911,860 B1 | 6/2005 | Wang et al. | |
| 6,922,080 B2 | 7/2005 | Haigh et al. | |
| 6,927,662 B2 | 8/2005 | Kahlmann et al. | |
| 6,972,803 B2 | 12/2005 | Seth-Smith et al. | |
| 6,977,522 B1 | 12/2005 | Murabayashi et al. | |
| 6,993,087 B2 | 1/2006 | Rosnell et al. | |
| 7,010,621 B2 | 3/2006 | Calkins et al. | |
| 7,016,490 B2 | 3/2006 | Beutler et al. | |
| 7,061,189 B2 | 6/2006 | Newman, Jr. et al. | |
| 7,075,329 B2 | 7/2006 | Chen et al. | |
| 7,098,766 B2 | 8/2006 | Gardner et al. | |
| 7,102,388 B2 | 9/2006 | Murabayashi et al. | |
| 7,113,750 B2 | 9/2006 | Eastwood | |
| 7,116,183 B2 | 10/2006 | Wu | |
| 7,167,213 B1 | 1/2007 | Murdock et al. | |
| 7,171,739 B2 | 2/2007 | Yang et al. | |
| 7,199,562 B2 | 4/2007 | Muterspaugh | |
| 7,227,585 B1 | 6/2007 | Murdock et al. | |
| 7,253,565 B2 | 8/2007 | Kang et al. | |
| 7,277,491 B2 | 10/2007 | Dong et al. | |
| 7,334,417 B2 | 2/2008 | Tokushige et al. | |
| 7,376,212 B2 | 5/2008 | Dupuis | |
| 7,477,676 B2 | 1/2009 | Kokubo et al. | |
| 7,489,526 B2 | 2/2009 | Chen et al. | |
| 7,545,059 B2 | 6/2009 | Chen et al. | |
| 7,548,440 B2 | 6/2009 | Chen et al. | |
| 7,558,080 B2 | 7/2009 | Chen et al. | |
| 7,613,016 B2 | 11/2009 | Chen et al. | |
| 7,659,775 B2 | 2/2010 | He et al. | |
| 7,671,372 B2 | 3/2010 | Morikawa | |
| 7,683,654 B2 | 3/2010 | Chen et al. | |
| 7,692,444 B2 | 4/2010 | Chen et al. | |
| 7,701,375 B1 | 4/2010 | Cosand | |
| 7,706,154 B2 | 4/2010 | Chen et al. | |
| 7,719,305 B2 | 5/2010 | Chen | |
| 7,741,896 B2* | 6/2010 | Chow | H01L 23/48 257/500 |
| 7,881,461 B2 | 2/2011 | Skov et al. | |
| 7,902,627 B2 | 3/2011 | Dong et al. | |
| 7,919,781 B2 | 4/2011 | Wang et al. | |
| 7,920,010 B2 | 4/2011 | Chen, Jr. et al. | |
| 7,923,710 B2 | 4/2011 | Crawley et al. | |
| 8,084,894 B2 | 12/2011 | Chen | |
| 8,116,055 B2 | 2/2012 | Baumgartner et al. | |
| 8,169,108 B2 | 5/2012 | Dupuis et al. | |
| 8,364,195 B2 | 1/2013 | Spina et al. | |
| 8,428,539 B2 | 4/2013 | Dupuis | |
| 8,502,584 B1 | 8/2013 | Zhiwei et al. | |
| 8,618,787 B1 | 12/2013 | Quinn | |
| 8,693,528 B1 | 4/2014 | Shrestha et al. | |
| 8,693,557 B1* | 4/2014 | Zhang | H04L 25/0266 375/259 |
| 8,724,355 B1 | 5/2014 | Pinkhasov et al. | |
| 8,736,343 B2 | 5/2014 | Chen et al. | |
| 8,867,592 B2 | 10/2014 | Shrestha | |
| 9,319,256 B2 | 4/2016 | Park et al. | |
| 9,473,329 B1* | 10/2016 | Edwards | H04L 25/0268 |
| 9,660,848 B2 | 5/2017 | Yun et al. | |
| 2003/0042571 A1 | 3/2003 | Chen et al. | |
| 2003/0052712 A1 | 3/2003 | Comer | |
| 2003/0075990 A1 | 4/2003 | Guitton et al. | |
| 2003/0107411 A1 | 6/2003 | Martin et al. | |
| 2003/0163748 A1 | 8/2003 | Calkins et al. | |
| 2004/0076221 A1 | 4/2004 | Refaeli et al. | |
| 2004/0184289 A1 | 9/2004 | Vinciarelli | |
| 2004/0207763 A1 | 10/2004 | Ciardi | |
| 2005/0008113 A1 | 1/2005 | Kokubo et al. | |
| 2005/0033902 A1 | 2/2005 | Tamura | |
| 2005/0047511 A1 | 3/2005 | Dosho et al. | |
| 2005/0272378 A1 | 12/2005 | Dupuis | |
| 2005/0288739 A1 | 12/2005 | Hassler et al. | |
| 2006/039169 A1 | 2/2006 | Chen et al. | |
| 2006/0109918 A1* | 5/2006 | Brown | H04B 3/02 375/258 |
| 2006/0120115 A1 | 6/2006 | Chen et al. | |
| 2006/0202721 A1 | 9/2006 | Partow et al. | |
| 2007/0052399 A1 | 3/2007 | Chen et al. | |
| 2007/0052514 A1 | 3/2007 | Chen et al. | |
| 2007/0097263 A1 | 5/2007 | Kim | |
| 2007/0133144 A1 | 6/2007 | Lewis | |
| 2007/0258513 A1 | 11/2007 | Strzalkowski | |
| 2008/0055190 A1 | 3/2008 | Lee | |
| 2008/0094046 A1 | 4/2008 | Chen et al. | |
| 2008/0279288 A1* | 11/2008 | Crawley | H03K 3/35613 375/244 |
| 2008/0311862 A1 | 12/2008 | Spina et al. | |
| 2008/0315925 A1 | 12/2008 | Alfano et al. | |
| 2009/0028320 A1* | 1/2009 | Fuehrer | H04M 11/06 379/392.01 |
| 2009/0168462 A1 | 7/2009 | Schopfer et al. | |
| 2009/0184754 A1 | 7/2009 | Chen | |
| 2009/0195082 A1 | 8/2009 | Chen | |
| 2009/0206960 A1* | 8/2009 | Ng | H01L 23/48 333/247 |
| 2010/0052430 A1 | 3/2010 | Takaishi et al. | |
| 2010/0054345 A1 | 3/2010 | Yamamoto | |
| 2010/0106041 A1 | 4/2010 | Ghovanloo et al. | |
| 2010/0111218 A1 | 5/2010 | Chen, Jr. | |
| 2010/0329364 A1 | 12/2010 | Giombanco et al. | |
| 2011/0028104 A1* | 2/2011 | Giombanco | H04L 25/0266 455/78 |
| 2011/0248787 A1 | 10/2011 | Jiang | |
| 2012/0025921 A1 | 2/2012 | Yang et al. | |
| 2012/0074990 A1 | 3/2012 | Sornin | |
| 2012/0112822 A1 | 5/2012 | Marshall | |
| 2012/0212251 A1 | 8/2012 | Yanagishima et al. | |
| 2013/0002366 A1 | 1/2013 | Sabut et al. | |
| 2013/0106515 A1 | 5/2013 | Lin | |
| 2013/0285465 A1 | 10/2013 | Takeda et al. | |
| 2013/0301690 A1 | 11/2013 | Shrestha | |
| 2014/0062527 A1 | 3/2014 | Mills et al. | |
| 2014/0091954 A1 | 4/2014 | Zhu et al. | |
| 2014/0169038 A1 | 6/2014 | Kamath et al. | |
| 2014/0286446 A1 | 9/2014 | Takeda et al. | |
| 2015/0110224 A1 | 4/2015 | Kang et al. | |
| 2015/0222241 A1* | 8/2015 | Brudermann | H04L 25/0266 375/256 |
| 2015/0236698 A1 | 8/2015 | Pedersen | |
| 2015/0256369 A1 | 9/2015 | Park et al. | |
| 2016/0080181 A1 | 3/2016 | Yun et al. | |
| 2016/0080183 A1* | 3/2016 | Yun | H04L 27/06 375/320 |
| 2016/0087914 A1* | 3/2016 | Goswami | H04B 5/0031 370/442 |
| 2016/0126724 A1* | 5/2016 | Yun | H04L 25/0276 361/111 |

FOREIGN PATENT DOCUMENTS

| | | |
|---|---|---|
| CN | 102307003 A | 1/2012 |
| CN | 102437849 A | 5/2012 |
| CN | 102484449 A | 5/2012 |
| CN | 103580607 A | 2/2014 |
| CN | 103607201 A | 2/2014 |
| CN | 101877683 B | 8/2014 |
| CN | 104852727 A | 8/2015 |
| DE | 2529296 A1 | 1/1977 |
| DE | 19718420 A1 | 11/1998 |
| DE | 19922129 C1 | 9/2000 |
| DE | 19922123 A1 | 11/2000 |
| DE | 19922127 A1 | 11/2000 |
| DE | 19922128 C1 | 1/2001 |
| DE | 10100282 A1 | 7/2002 |
| DE | 102009039414 A1 | 4/2010 |
| EP | 0282102 A2 | 9/1988 |
| EP | 0307345 A1 | 3/1989 |

(56) References Cited

FOREIGN PATENT DOCUMENTS

| | | |
|---|---|---|
| EP | 0586062 A1 | 3/1994 |
| EP | 0708529 A2 | 4/1996 |
| EP | 0 913 947 A2 | 5/1999 |
| EP | 0917309 A2 | 5/1999 |
| EP | 0977406 A1 | 2/2000 |
| EP | 1 168 804 A2 | 1/2002 |
| EP | 1171980 A1 | 1/2002 |
| EP | 1209791 A2 | 5/2002 |
| EP | 1 753 129 A1 | 2/2007 |
| EP | 1 990 914 A2 | 11/2008 |
| EP | 2 280 488 A1 | 2/2011 |
| EP | 2282405 A2 | 2/2011 |
| EP | 1550194 B1 | 11/2012 |
| EP | 2 645 589 A1 | 10/2013 |
| EP | 3 002 875 A1 | 4/2016 |
| FR | 2679670 A1 | 1/1993 |
| GB | 2173956 | 10/1986 |
| JP | S57132460 A | 8/1982 |
| JP | S58215833 A | 12/1983 |
| JP | H07115768 A | 5/1995 |
| JP | H0937558 A | 2/1997 |
| JP | H10178398 A | 6/1998 |
| JP | H10191654 A | 7/1998 |
| JP | 2002508916 A | 3/2002 |
| JP | 2002-118605 A | 4/2002 |
| JP | 2002262545 A | 9/2002 |
| JP | 2010-088112 A | 4/2010 |
| JP | 2011134347 A | 7/2011 |
| TW | 200635245 A | 10/2006 |
| WO | WO 8100658 A1 | 3/1981 |
| WO | WO 9505033 A1 | 2/1995 |
| WO | WO 9520768 A1 | 8/1995 |
| WO | WO 97-17763 A2 | 5/1997 |
| WO | WO 9837672 A1 | 8/1998 |
| WO | WO 9848541 A2 | 10/1998 |
| WO | WO 9921332 A1 | 4/1999 |
| WO | WO 0128094 A1 | 4/2001 |
| WO | WO 0161951 A1 | 8/2001 |
| WO | WO 02073914 A1 | 9/2002 |
| WO | WO 02086969 A2 | 10/2002 |
| WO | WO 2004-100473 A2 | 11/2004 |
| WO | WO 200586062 A2 | 9/2005 |
| WO | WO 2012/036014 A1 | 3/2012 |
| WO | WO 2012085951 A1 | 6/2012 |
| WO | 2014036594 A1 | 3/2014 |

OTHER PUBLICATIONS

German Examination Report dated Jun. 21, 2017 and partial English translation thereof in connection with German Application No. 102015118514.8.
Partial European Search Report dated Feb. 9, 2016, in European Application No. 15183918.0.
Extended European Search Report dated Jul. 1, 2016 in connection with European Application No. 15183918.0.
Partial European Search Report dated Feb. 9, 2016, in European Application No. 15183914.9.
Extended European Search Report dated May 23, 2016 for Application No. EP 15183914.9.
Extended European Search Report dated Feb. 16, 2017 in connection with European Application No. 16154322.8.
Der et al. "A Switched-Capacitor Differencing Circuit with Common-Mode Rejection for Fully Differential Comparators," Proceedings of the 36th Midwest Symposium on Circuits and Systems, Aug. 1993, vol. 2, pp. 911-914.
Gupta et al., "Asymmetric Cross-Coupled Differential Pair Confirguration to Realize Neuron Activation Function and Its Derivative", IEEE Transactions on Circuits and Systems II: Express Briefs, vol. 52, No. 1, Jan. 2005, pp. 10-13. cited by applicant.
"IEEE Standard for a High Performance Serial Bus", IEEE Std 1394-1995, Microprocessor and Microcomputer Standards Committee, 1996, pp. i-viii, pp. 1-384, no month.

Akiyama et al., "A High-Voltage Monolithic Isolator for a Communication Network Interface," IEEE Transactions on Electron Devices, vol. 49, No. 5, May 2002, pp. 895-901.
All About Circuits, "An Electric Pendulum", Textbook, vol. II—Alternating Circuit (AC), Chapter 6: Resonance, allaboutcircuits.com, Jul. 12, 2004, 5 pages.
Analog Devices, "Frequently Asked Questions: Isolation, iCoupler Technology, and iCoupler Products", Mar. 2006, 10 pages.
Analog Devices, "High Precision, Low Offset, mV Input Isolation Amplifier," AD208 datasheet, 16 pages, no date.
Analog Devices, "High Speed Digital Isolators", ADuM1100AR / ADuM1100BR datasheet, Rev. 0, 2001, 12 pages, no month.
Analog Devices, "High Speed, Logic Isolator With Power Transformer", AD260 datasheet, Rev. 0, Sep. 1998, 8 pages.
Analog Devices, "iCoupler Digital Isolation Products", 2005, 12 pages, no month.
Analog Devices, "iCoupler Isolation in RS-232 Applications", Application Note AN-740, Rev. 0, Jul. 2004, 8 pages.
Analog Devices, "iCoupler Isolation in RS-485 Applications", Application Note AN-727, Rev. 0, Jun. 2004, 12 pages.
Analog Devices, "Low Cost, Miniature Isolation Amplifiers", AD202 / AD204 datasheet, Rev. B, 1994, 12 pages, no month.
Analog Devices, "Precision, Wide Bandwidth 3-Port Isolation Amplifier", AD210 datasheet, Rev. A, 8 pages, no date.
Analog Devices, "Rugged, Military Temperature Range, 10 kHz Bandwidth Isolation Amplifier", AD203SN datasheet, Rev. A, 12 pages, no date.
Avago Technologies, "Dual-Channel High Speed 15 MBd CMOS Optocoupler", QCPL-073H datasheet, Jul. 2007, 10 pages.
Avago Technologies, "Single-Channel High Speed 15 MBd CMOS Optocoupler" QCPL-070H datasheet, Jul. 2007, 10 pages.
Banerjee and Kliger, "Micromachined Magnetics: a New Step in the Evolution of Isolation Technology", Electronic Engineering, Jun. 2000, pp. 27-32.
Baumann, "Free-Running Bridge Inverter", IBM Technical Disclosure Bulletin, vol. 9, No. 10, Mar. 1967, p. 1462.
Bourgeois, "PCB Based Transformer for Power MOSFET Drive", IEEE, 1994, pp. 238-244.
Burr-Brown, "Dual, Isolated, Bi-Directional Digital Coupler", IS0150 datasheet, 3 versions, 1993-2007, 38 pages, no month.
Business Wire, "Emerson Selects Analog Devices' Digital Isolation Technology for Industrial Systems; ADI's iCoupler Technology Enables Low-Cost Signal Isolation in High-Temperature Environments", Sep. 24, 2003, 2 pages.
Business Wire, "Pulse's New Miniature Transformers are Optimized for Wideband RF Applications", Jul. 26, 2000, 2 pages.
Chang et al., "A Spread-Spectrum Clock Generator with Triangular Modulation", IEEE Journal of Solid-State Circuits, vol. 38, No. 4, Apr. 2003, pp. 673-676.
Chen et al., "High Speed Digital Isolators Using Microscale On-Chip Transformers", Elektronik, Jul. 22, 2003, English version, 6 pages.
Chiu et al., "Thin-Film Inductive Heads", IBM J. Res. Develop., vol. 40, No. 3, May 1996, pp. 283-300.
Christiansen, "Pulse-Code Modulation (PCM)", Electronics Engineers' Handbook, Fourth Edition, McGraw-Hill, Inc., 1996, 3 pages (unnumbered), no month.
Chu et al., "High-Voltage CMOS Decoder/Driver for Plasma Displays", 1976 IEEE International Solid-State Circuits Conference (ISSCC 76), Digest of Technical Papers, vol. XIX, Feb. 1976, pp. 212-213.
Cypress Semiconductor, "Spread Spectrum Clock Generator", SM560 datasheet, Rev. E, Jun. 2004, 8 pages.
Cypress Semiconductor, "Spread Spectrum Clock Generator", SM561 datasheet, Rev. C, Dec. 2002, 8 pages.
Dotter et al., "Implementation of an Adaptive Balancing Hybrid", IEEE Transactions on Communications, vol. 28, No. 8, Aug. 1980, pp. 1408-1416.
EDN Network, "Welcome to the 17th Annual EDN Innovation Awards: EDN's 2006 Innovation Awards Nominees--Nominee Detail--ADuM125xI2C Digital Isolators (Analog Devices)", Reed Business Information, 2007, 2 pages, no month.

(56) References Cited

OTHER PUBLICATIONS

EE Times Asia, "ADI Digital Isolators Reduce Per-Channel Costs", New Products, Jun. 19, 2003, 1 page.
EE Times Online, "EE Times Names ACE Finalists", Latest News, Jan. 15, 2007, 3 pages.
El-Hammanmsy, "Design of High-Efficiency RF Class-D Power Amplifier", IEEE Transactions on Power Electronics, vol. 9, No. 3, May 1994, pp. 297-308.
Fleming, "Isolation Amplifiers Break Ground Loops and Achieve High CMRR", EDN, vol. 32, No. 26, Dec. 24, 1987, pp. 97-102, and p. 5.
Gallo et al., "An Unity High Power Factor Power Supply Rectifier Using a PWM AC/DC Full Bridge Soft-Switching", 17th Annual IEEE Applied Power Electronics Conference and Exposition (APEC 2002), Mar. 2002, pp. 1190-1194.
Geen et al., "Miniature Multilayer Spiral Inductors for GaAs MMICs", 11th Annual IEEE Gallium Arsenide Integrated Circuit (GaAs IC) Symposium, Oct. 22-25, 1989, Technical Digest, pp. 303-306.
Ghiorse and Ranta, "Isolation in Medical Applications", Power Electronics Europe, Jul. 2005, 2 pages.
Greenhouse, "Design of Planar Rectangular Microelectronic Inductors", IEEE Transactions on Parts, Hybrids, and Packaging, vol. 10, No. 2, Jun. 1974, pp. 101-109.
Hermann et al., "Magnetically Coupled Linear Isolator", IEEE Transactions on Magnetics, vol. 33, No. 5, Sep. 1997, pp. 4029-4031.
Hewlett Packard, "40 ns Prop. Delay, SO-8 Optocoupler", HCPL-0710 Technical Data, 16 pages.
International Microcircuits, "Low EMI Spectrum Spread Clock", SM530 datasheet, Rev. 1.6, Jan. 1999, 16 pages.
Irvine, "Early Digital Computers at Bell Telephone Laboratories", IEEE Annals of the History of Computing, Jul.-Sep. 2001, pp. 22-42.
Jaycar Electronics, "DC-DC Converters: A Primer", DCDCONV Reference Data Sheet, 2001, 5 pages, no month.
Kehrer, "Design of Monolithic Integrated Lumped Transformers in Silicon-based Technologies up to 20 GHz", Master's thesis, Technical University of Vienna, Institute of Communications and Radio-Frequency Engineering, Dec. 2000, 85 pages. cited by applicant.
Kester, "Digital Isolation Techniques", Practical Design Techniques for Sensor Signal Conditioning, Section 10: Hardware Design Techniques, Analog Devices, Inc., 1999, pp. 10.55- 10.57, no month.
Kester, "Origins of Real-World Signals and Their Units of Measurement", Mixed Signal and DSP Design Techniques, Section 1: Introduction, Newnes, 2003, pp. 1.1-1.10, no month.
Kliger et al., "Isolation with Waferscale Transformers", Digital Isolation, Power Electronics Europe, Issue 6, 2005, pp. 40-43, no month.
Kliger, "Integrated Transformer-Coupled Isolation", IEEE Instrumentation & Measurement Magazine, Mar. 2003, pp. 16-19.
Knoedl, Jr., et al., "A Monolithic Signal Isolator", 4th Annual IEEE Applied Power Electronics Conference and Exposition (APEC '89), Mar. 13-17, 1989, Conference Proceedings, pp. 165-170.
Kojima et al., "2.3 kVac 100 MHz Multi-Channel Monolithic Isolator IC," 12th International Symposium on Power Semiconductor Devices and ICs (ISPSD'2000), May 2000, pp. 309-312.
Kojima et al., "A Novel Monolithic Isolator for a Communications Network Interface IC", 11th Annual IEEE International ASIC Conference, Sep. 1998, pp. 255-258.
Kuhn et al., "An RF-Based IEEE 1394 Ground Isolator Designed in a Silicon-on-Insulator Process", 44th IEEE Midwest Symposium on Circuits and Systems (MWSCAS 2001), Aug. 2001, pp. 764-767.
Kuisma, "Variable Frequency Switching in Power Supply EMI--Control: An Overview", IEEE AES Systems Magazine, Dec. 2003, pp. 18-22.
Lam et al., "High-Isolation Bonding Pad Design for Silicon RFIC up to 20 GHz", IEEE Electron Device Letters, vol. 24, No. 9, Sep. 2003, pp. 601-603.

Laughton et al., "Digital Control Systems", Electrical Engineers Reference Book, Sixteenth Edition, Chapter 14, Newnes, 2003, 3 cover sheets (unnumbered), pp. 14/6-14/9, no month.
Ledwich, "DC-DC Converter Basics", Power Designers, 1998, www.powerdesigners.com, 11 pages, no month.
Long et al., "A 1.9 GHz Low-Voltage Silicon Bipolar Receiver Front-End for Wireless Personal Communications Systems", IEEE Journal of Solid-State Circuits, vol. 30, No. 12, Dec. 1995, pp. 1438-1448.
Lu et al., A Rail-To-Rail Class-AB Amplifier With an Offset Cancellation for LCD Drivers. IEEE J Solid-State Circ. Feb. 2009; 44(2):525-37.
Moss et al., "Integrated Circuit D-MOS Telephone Crosspoint Array," 1976 IEEE International Solid-State Circuits Conference (ISSCC 76), Digest of Technical Papers, vol. XIX, Feb. 1976, pp. 32-33, 226.
National Instruments, "Isolation Technologies for Reliable Industrial Measurements", Whitepaper, 2006, 11 pages, no month.
National Instruments, "Technologies behind NI Industrial M and S Series Data Acquisition Devices with Isolation", NI Developer Zone, Oct. 3, 2007, 5 pages.
Ng et al., "Optimized Geometrical Features of Monolithic Spiral RF Transformers on Silicon", SAFE ProRISC SeSens 2001, Conference Proceedings, Nov. 2001, pp. 132-135.
Nihtianov, "Magnetogalvanic Approach to Isolation of Analog Circuits", IEEE Transactions on Instrumentation and Measurement, vol. 43, No. 4, Aug. 1994, pp. 677-680.
Niknejad et al., "Analysis, Design, and Optimization of Spiral Inductors and Transformers for Si RF ICs", IEEE Journal of Solid-State Circuits, vol. 33, No. 10, Oct. 1998, pp. 1470-1481.
NVE Corporation, "High Speed Digital Coupler", IL710 datasheet, Jul. 2002, 8 pages.
NVE Corporation, "High Speed Five-Channel Digital Isolators", IL260/1L261 datasheet, Rev. E, Apr. 2007, 11 pages.
Park et al., "Packaging Compatible Microtransformers on a Silicon Substrate", IEEE Transactions on Advanced Packaging, vol. 26, No. 2, May 2003, pp. 160-164.
Pickering, "A System Designer's Guide to Isolation Devices", Sensors, Jan. 1999, pp. 14-26 (7 pages).
PICO Electronics, "Audio Transformers: 2 Ohm to 40K Ohm; 400 Hz to 100 KHz, 400 milliwatt at 1KHz", datasheet, 8 pages, no date.
PowerZONE, "ADuM1300/Jan. 1400/01/02: Multi-Channel Digital Isolators for High-Voltage Industrial Applications", powerZONE Products for the week of May 26, 2003, 2 pages.
PR Newswire, "Electronics Technology Elite Compete for Industry's Highest Honors as EE Times Announces Finalists for 2007 EE Times ACE Awards", Jan. 15, 2007, 5 pages.
Premier Devices, "Surface Mount Transformer," XFA-0401-1U datasheet, 1 pages, no date.
Pulse Engineering, "RF Transformers, Transformers for Wideband RF Applications", C244.A datasheet, Oct. 2004, 2 pages.
Ronkainen et al., "IC Compatible Planar Inductors on Silicon", IEE Proceedings--Circuits Devices Systems, vol. 144, No. 1, Feb. 1997, pp. 29-35.
Roth, Jr., "Clocked Flip-Flops with Clear and Preset Inputs", Fundamentals of Logic Design, Third Edition, 1985, 2 Cover Sheets (unnumbered), pp. 254-256, no month.
Roth, Jr., "MOS and CMOS Logic", Fundamentals of Logic Design, Third Edition, 1985, 2 Cover Sheets (unnumbered), pp. 613-616, no month.
Sayani et al., "Isolated Feedback for Off-Line Switching Power Supplies with Primary-Side Control", 3rd Annual IEEE Applied Power Electronics Conference and Exposition (APEC '88), Feb. 1988, pp. 203-211 (5 pages).
Shin et al., "A 250-Mbit/s CMOS Crosspoint Switch", IEEE Journal of Solid-State Circuits, vol. 24, No. 2, Apr. 1989, pp. 478-486.
Silicon Laboratories, "Global Line-Side DAA for Embedded System-Side Module," Si306x datasheet, Rev. 0.9, Jan. 2005, 62 pages.
Silicon Laboratories, "Highlights of the Si844x Quad Digital Isolators," date unknown, 1 page.
Silicon Laboratories, "Quad-Channel Digital Isolator", Si8440/41/42/45 datasheet, Rev. 0.6, Aug. 2007, 30 pages.

(56) References Cited

OTHER PUBLICATIONS

Silicon Laboratories, "Silicon Laboratories Announces Industry's Fastest, Most Integrated Four Channel Digital Isolators", News Release, Mar. 20, 2006, 3 pages.

Silicon Laboratories, "Triple-Channel Digital Isolator", Si8430/31/35 datasheet, Rev. 0.3, Aug. 2007, 30 pages.

Simburger et al., "A Monolithic Transformer Coupled 5-W Silicon Power Amplifier with 59% PAE at 0.9 GHz", IEEE Journal of Solid-State Circuits, vol. 34, No. 12, Dec. 1999, pp. 1881-1892.

Small, "Medical Devices Demand Stringent Isolation Techniques", EDN, Sep. 28, 2006, pp. 41-49.

Standard Handbook for Electrical Engineers, "Carrier Communication, Tone Multiplex Equipment", Tenth Edition, McGraw-Hill, 1968, 2 Cover Sheets (unnumbered), pp. 15-75 and 15-84, 15-85, no month.

Streetman, "Monolithic Device Elements", Solid State Electronic Devices, Second Edition, Prentice-Hall, 1980, 2 Cover Sheets (unnumbered), pp. 346-347, no month.

Streetman, "Semiconductor Materials" and "Monolithic Device Elements", Solid State Electronic Devices, Third Edition, Prentice Hall, 1990, pp. 1-2 and p. 355, no month.

Sugawara et al., "1.5 Gbps, 5150 ppm Spread Spectrum SerDes PHY with a 0.3 mW, 1.5 Gbps Level Detector for Serial ATA", IEEE 2002 Symposium on VLSI Circuits, Digest of Technical Papers, Jun. 2002, pp. 60-63.

Sze, "Physics and Properties of Semiconductors--A Resume", Physics of Semiconductor Devices, Second Edition, John Wiley & Sons, 1981, 2 Cover Sheets (unnumbered), and p. 7, no month.

Tabisz et al., "Zero-Voltage-Switched Quasi-Resonant Buck and Flyback Converters-Experimental Results at 10MHz", IEEE Transactions on Power Electronics, vol. 4, No. 2, Apr. 1989, pp. 194-204.

Tang, et al., "A Low-Profile Low-Power Converter with Coreless PCB Isolation Transformer", IEEE Transactions on Power Electronics, vol. 16, No. 3, May 2001, pp. 311-315.

Tang, et al., "A Low-Profile Wide-Band Three-Port Isolation Amplifier with Coreless Printed-Circuit-Board (PCB) Transformers", IEEE Transactions on Industrial Electronics, vol. 48, No. 6, Dec. 2001, pp. 1180-1187.

Texas Instruments, "3.3-V / 5-V High-Speed Digital Isolators", ISO721 / ISO722 datasheet, Jan. 2006 (revised Feb. 2007), 24 pages.

Texas Instruments, "Dual Digital Isolators", 1507220 / 1507221 datasheet, Jul. 2006 (revised Aug. 2007), 25 pages.

Texas Instruments, "Quad Digital Isolators", ISO7240 / ISO7241 / ISO7242 datasheet, Sep. 2007 (revised Dec. 2007), 25 pages.

Tsang et al., "Design, Fabrication, and Performance of Spin-Valve Read Heads for Magnetic Recording Applications", IBM J. Res. Develop, vol. 42, No. 1, Jan. 1998, pp. 103-116.

Tse et al., "Analysis and Spectral Characteristics of a Spread-Spectrum Technique for Conducted EMI Suppression", IEEE Transactions on Power Electronics, vol. 15, No. 2, Mar. 2000, pp. 399-410.

Walker et al., "An Isolated MOSFET Gate Driver", Australasian Universities Power Engineering Conference (AUPEC '96), Oct. 1996, pp. 175-180.

Wedlock et al., "Capacitors", Electronic Components and Measurements, Prentice-Hall, 1969, 4 Cover Sheets (unnumbered), and p. 89, no month.

Wolf, "Silicon Processing for the VLSI Era, vol. 2: Process Integration", Lattice Press, 1990, 2 Cover Sheets (unnumbered), pp. 66-69, no month.

Zhou et al., "A Fully Integrated CMOS 900MHz LNA Utilizing Monolithic Transformers", IEEE International Conference on Solid-State Circuits, Feb. 5-7, 1998, Digest of Technical Papers, pp. 132-133.

Zhou et al., "Monolithic Transformers and Their Application in a Differential CMOS RF Low-Noise Amplifier", IEEE Journal of Solid State Circuits, vol. 33, No. 12, Dec. 1998, pp. 2020-2027.

\* cited by examiner

100

200

300

400

500

SIGNAL ISOLATOR SYSTEM WITH PROTECTION FOR COMMON MODE TRANSIENTS

BACKGROUND

The present invention relates to isolators and, in particular, to protection circuits for isolators that guard against common mode transients.

Isolators are devices that exchange data signals between two galvanically isolated circuit systems. The circuit systems each operate in different voltage domains, which may include different source potentials and different grounds. Isolation devices may provide data exchange across an isolation barrier, which maintains the galvanic isolation. Typical isolation devices include micro-transformers, capacitors, and magneto-resistors.

Many isolator devices are differentially-driven. That is, signal content ("$V_{SIG}$") is represented in a pair of signals that deviate differentially about a common mode voltage ("$V_{CM}$"). A first signal may deviate from the common mode voltage $V_{CM}$ by an amount $V_{SIG}$ (e.g., $V1=V_{CM}+V_{SIG}$) and a second signal may deviate from the common mode voltage $V_{CM}$ by the same amount $\Delta V$ but in complementary fashion (e.g., $V2=V_{CM}-V_{SIG}$). In this example, the $V_{SIG}$ value represents signal content. Isolator circuitry often is designed using the common mode voltage $V_{CM}$ as a design factor to transmit and/or receive these differentially-driven signals representing signal content.

Isolator devices often are used in noisy environments. They may be subject to electro-magnetic transients that cause signal corruption in the signals that are transmitted and received by such systems. Some transients cause deviation in the common mode of the signals being transmitted by the system. Thus, where a differential signal pair ideally would deviate from the common mode in differential fashion, a common mode transient may cause the differential signals to vary together in a manner that interferes with operation of the isolator (e.g., $V1=V_{CM}+V_{EMI}+V_{SIG}$, $V2=V_{CM}+V_{EMI}-V_{SIG}$). Some transients may cause these signals to exceed the supply voltages ($V_{DD}$ or ground) of the circuitry that receive and decode the signals, which can lead to the signals being decoded incorrectly.

The inventors perceive a need in the art for an isolator system that protects against common mode transients in operation.

DETAILED DESCRIPTION

Embodiments of the present invention provide an isolator system having an isolator that generates differential isolator signals and a receiver that generates digital data representative of signals received from the isolator. The system also may include an RC filter coupled between the isolator and the receiver. During operation, the filter may distribute transient signals across various circuit paths in the isolator, only some of which are coupled to the receiver inputs. Over time, the filter may attenuate transient contributions at the receiver inputs. In this manner, the filter may limit effects of these common mode transients.

Figure 1:
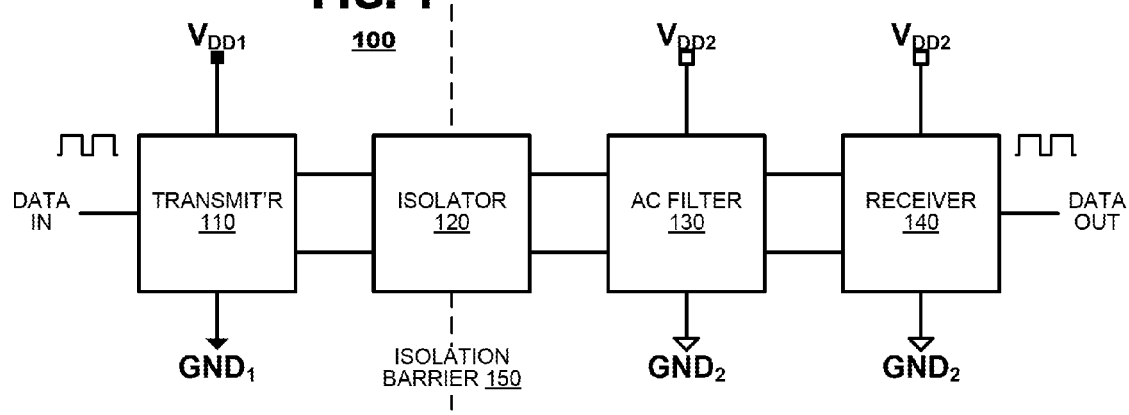
FIG. 1 illustrates an isolator system according to an embodiment of the present invention.

FIG. 1 illustrates an isolator system 100 according to an embodiment of the present invention. The system 100 may include a transmitter 110, an isolator 120, a filter 130, and a receiver 140. The isolator 120 may span an isolation barrier 150, which galvanically isolates two voltage domains from each other. The transmitter 110 may belong to a first voltage domain, which possesses its own voltage and ground supplies (shown as $V_{DD1}$, $GND_1$), and the filter 130 and the receiver 140 may belong to a second voltage domain, which possesses voltage and ground supplies ($V_{DD2}$, $GND_2$) that are separate from the supplies of the first voltage domain. The isolation barrier 150 may prevent communication of voltages from one domain to the other.

The system 100 may be provided for communication of digital data from the first voltage domain to the second voltage domain. In such an embodiment, the transmitter 110 may receive an input signal that takes one of two binary voltage levels. The transmitter 110 may generate an output signal having a state that is determined from the state of the input signal. The output signal may be carried by the isolator 120 from the first voltage domain to the second voltage domain across the isolation barrier 150. The receiver 140 may receive signals from the isolator 120 (which may be filtered as discussed herein) and generate a digital output signal therefrom.

Data may be transmitted across the isolator 120 by any of a variety of techniques, including, for example, on-off keying, pulse count modulation, pulse polarity modulation, and the like. In on-off keying, if the input signal corresponds to a binary value of "1," the transmitter 110 may generate a periodic signal at its output; but, if the input signal corresponds to a binary value of "0," the transmitter 110 may output an inert signal (no activity). Pulse count modulation may involve transmission of a single pulse signal to represent a first binary value (e.g., a digital "0") and a multi-pulse signal to represent a second binary value (a digital "1"). Pulse polarity modulation may involve transmission of a pulse with a first polarity to represent a first binary value (e.g., a positive pulse to represent a digital "1") and a pulse with a second polarity to represent a second binary value (e.g., a negative pulse to represent a digital "0"). The principles of the present invention find application with any differentially driven isolator structure.

A variety of isolator devices may be employed as the isolator 120, including micro-transformer-based isolators, capacitive isolators and/or magneto-resistive isolators.

Figure 2:
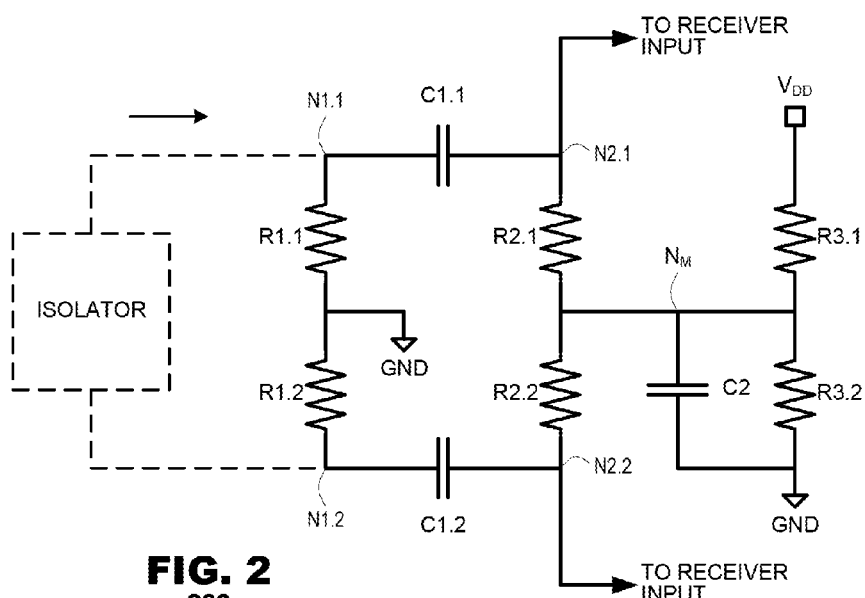
FIG. 2 illustrates a filter according to an embodiment of the present invention.

FIG. 2 illustrates a filter 200 according to an embodiment of the present invention. The network 200 may find application as the filter 130 of FIG. 1. The network may include a pair of first stage resistors R1.1, R1.2, input capacitors C1.1, C1.2, a pair of second stage resistors R2.1, R2.2, a pair of third stage resistors R3.1, R3.2 and another capacitor C2.

First terminals of the first stage resistors R1.1, R1.2 may be coupled to respective terminals of the isolator, shown as nodes N1.1 and N1.2. Second terminals of the first stage resistors R1.1, R2.1 may be connected to ground.

First terminals of the input capacitors C1.1, C1.2 also may be coupled to respective terminals of the isolator at nodes N1.1 and N1.2. Second terminals of the input capacitors C1.1, C1.2 may be connected to first terminals of respective second stage resistors R2.1, R2.2 at nodes N2.1 and N2.2.

Second terminals of the second stage resistors may be connected to each other and to capacitor C2 and the third stage resistors R3.1, R3.2.

The third stage resistors R3.1, R3.2 may be connected in series between voltage supplies $V_{DD}$ and ground GND. A first terminal of the capacitor C2 may be connected to an intermediate node $N_M$ between the third stage resistors R3.1 and R3.2, and a second terminal of the capacitor C2 may be connected to ground GND. The resistors R3.1 and R3.2 may have equal resistances, which may hold a voltage across the capacitor C2 at a common mode level of $\frac{1}{2}V_{DD}$, in the absence of transients.

In the example of FIG. 2, second terminals of each of the first stage resistors R1.1, R1.2 are shown coupled to ground. This connection defines ground as a common mode voltage for the first stage resistors R1.1, R1.2. The second terminals of the second stage resistors R2.1, R2.2, however, are connected to node $N_M$, which is connected to an intermediate node between resistors R3.1 and R3.2. This connection may define $\frac{1}{2}V_{DD}$ as a common mode voltage for the second and third stage resistors R2.1, R2.2, R3.1, and R3.2. These two common mode domains may be kept discrete from each other by the interposition of capacitors C1.1 and C1.2 between nodes N1.1, N1.2 on one side and nodes N2.1, N2.2 on the other side. In other circuit applications, it may be convenient to define common mode voltages that differ from the ground and $\frac{1}{2}V_{DD}$ voltages shown in FIG. 2.

The capacitance of capacitor C2 may be larger than the capacitance of capacitors C1.1 and C1.2. For example, the capacitance of C2 may be 6 to 10 times larger than that of capacitors C1.1 and C1.2.

During operation, the isolator may present a differential input voltage to the filter at nodes N1.1, N1.2. That is, in ideal operating conditions, the voltage presented at node N1.1 would be centered about a common mode voltage and would vary inversely with the voltage presented at N1.2, which also is centered about the common mode voltage. The common mode voltage would not vary during ideal operating conditions.

Operating conditions, however, can induce transients at the isolator that cause the common mode voltage to deviate from its ideal value. Such transients can cause the common mode voltage to exceed the high supply voltage $V_{DD}$ or fall lower than ground. Transients in excess of $V_{DD}$ or lower than ground, if input to the receiver 140 (FIG. 1), may cause improper operation at the receiver 140.

The embodiment of FIG. 2 may reduce effects of such transients in an isolator system. Transients often are short term, high-frequency events in which capacitors C1.1 and C1.2 may appear as short circuits. Thus, when a transient is presented at nodes N1.1 and N1.2, the first and second stage resistors R1.1, R1.2, R2.1 and R2.2 may appear as a simple, parallel resistive network, which helps attenuate the magnitude of the transients presented to the receiver 140 (FIG. 1).

Figure 3:
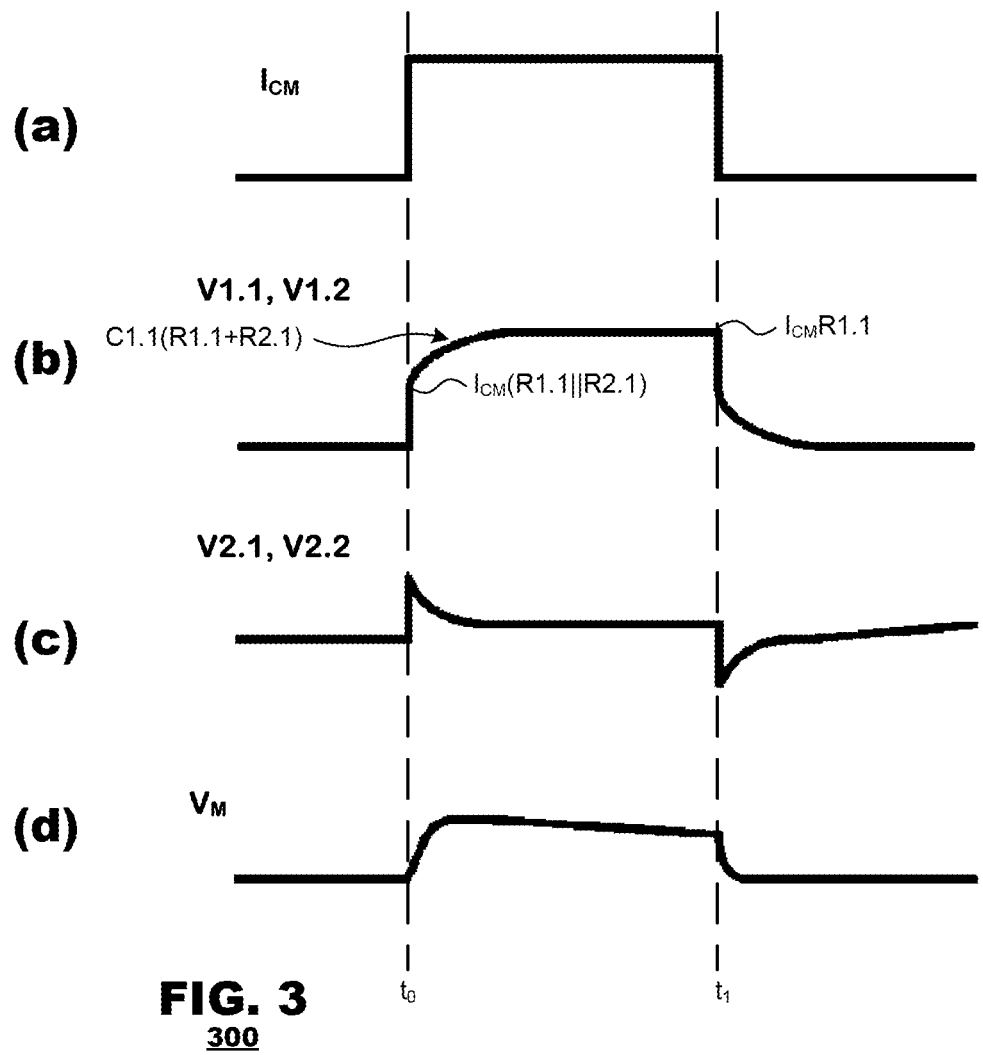
FIG. 3 illustrates exemplary waveforms representing response of the filter of FIG. 2 to a common mode transient, according to an embodiment of the present invention.

FIG. 3 illustrates a series of exemplary waveforms representing propagation of a transient in the circuit of FIG. 2. Graph (a) illustrates a common mode component of a transient that may be presented from an isolator. It is presented non-differentially at both nodes N1.2 and N1.2. In this example, the transient is illustrated as current pulse $I_{CM}$ that begins a time t0 and continues until time t1. In practice, transients may have differential components as well but these are not illustrated in the example of FIG. 3.

At the onset of the transient current pulse, the current $I_{CM}$ may be split between the first stage resistors R1.1, R1.2 and the second stage resistors R2.1, R2.2. Mathematically, these currents may be represented as:

$$I_{R1.1} = I_{R1.2} = \frac{I_{CM} R2.2}{R1.1 + R2.1}, \text{ and}$$

$$I_{R2.1} = I_{R2.2} = \frac{I_{CM} R1.1}{R1.1 + R2.1},$$

where $I_{R1.1}$ and $I_{R1.2}$ respectively represent currents through resistors R1.1 and R1.2, and $I_{R2.1}$ and $I_{R2.2}$, respectively, represent currents through resistors R2.1 and R2.2.

In the voltage domain, voltages V1.1, V1.2 at nodes N1.1 and N1.2 may be shifted from their common mode voltage (ground) to:

$$V1.1 = V1.2 = I_{CM}(R1.1 \| R2.1),$$

where $R1.1 \| R2.1$ represents an effective impedance presented by a parallel connection of resistors R1.1 and R2.1. Thus, in graph 3(b), voltages V1.1 and V1.2 are illustrated as transitioning to this level at time $t_0$.

Similarly, voltages V2.1, V2.2 at nodes N2.1 and N2.2 may be shifted from their common mode voltage ($\frac{1}{2}V_{DD}$) to:

$$V2.1 = V2.2 = \frac{1}{2}V_{DD} + I_{CM}(R1.1 \| R2.1).$$

Thus, in graph 3(c), voltages V2.1 and V2.2 are illustrated as transitioning to this level at time $t_0$.

If the current transient has a long enough duration, then the capacitors C1.1, C1.2 may present impedance to the transient current pulse $I_{CM}$. Coupled with the first and second stage resistors R1.1, R1.2, R2.1 and R2.2, the capacitors C1.1, C1.2 form an RC network with a time constant:

$$\tau = C1.1 \cdot (R1.1 + R2.1).$$

Thus, graph 3(b) illustrates voltages V1.1 and V1.2 transitioning toward a voltage $V = I_{CM} \cdot R1.1$ at a rate determined by the time constant $\tau$.

Similarly, if the current transient has a long enough duration, then the capacitors C1.1, C1.2 and C2 behave as an RC network with the second and third stage resistors R2.1, R2.2, R3.1 and R3.2. Voltages V2.1 and V2.2, at nodes N2.1 and N2.1, may decay from their shifted value to an intermediate value given by:

$$V2.1 = V2.2 = \frac{1}{2}V_{DD} + I_{CM} R2.2 \frac{C1.1}{C2}.$$

Thus, graph 3(c) illustrates the voltages V2.1 and V2.2 decaying to this level following the initial shift at time $t_0$. As shown in above equation, when C2 is 6 to 10 times larger than C1.1 and C1.2, it can reduce the voltage variations caused by the common mode current $I_{CM}$.

At node $N_M$, the capacitor C2 may be modeled as receiving a current pulse through both of the second stage resistors R2.1 and R2.2. It may receive a current pulse having the form:

$$I_{C2} = 2 I_{CM} \frac{R2.2}{R2.1 + R2.2}.$$

The voltage at node $N_M$, therefore, may have a peak of:

$$V_M = \frac{1}{2}V_{DD} + 2I_{CM}R2.2\frac{C1.1}{C2}.$$

FIG. 3(d) illustrates these effects.

The transient current $I_{CM}$ is illustrated as terminating instantly at time $t_1$. The filter 200 may respond in a complementary fashion to the transition illustrated at time $t_0$. That is, the voltages V1.1, V1.2 may be shifted from its voltage V1.1=V1.2=$I_{CM}$*R1.1 by an amount represented by $\Delta V1.1=\Delta V1.2=-I_{CM}(R2.1\|R2.2)$, then may transition toward zero according to the time constant $\tau$. Similarly, the voltages V2.1, V2.2 may be shifted from the voltages $$V2.1 = V2.2 = \frac{1}{2}V_{DD} + I_{CM}R2.2\frac{C1.1}{C2}$$

by an amount $\Delta V2.1=\Delta V2.2=-I_{CM}(R2.1\|R2.2)$. After these initial transitions, the voltages V1.1, V1.2, V2.1 and V2.2 may transition to steady state voltages represented by their ordinary common mode values of ground and $V_{DD}$, respectively.

As indicated, the graphs of FIG. 3 represent simulations of voltages within the filter 200 when presented by a transient current pulse that represents a step function. This step function (graph 3(a)) represents a current that instantaneously transitions, at time t0, from magnitude zero to a magnitude $I_{CM}$ and instantaneously transitions, at time t1, from magnitude $I_{CM}$ back to magnitude zero. In practice, such current transitions are likely to have finite rise times and fall times, which may cause peaks of the voltages a V1.1, V1.2, V2.1 and V2.2 to be lower than those represented in this simulation.

Returning to FIG. 2, the filter 200 provides circuit designers with opportunities to mitigate effects of transients in circuit design. As noted, abnormal receiver behavior may occur if input voltages (those as nodes N2.1 and N2.2) exceed $V_{DD}$ or fall below ground. Circuit designers, however, may select resistance values for resistors R2.1, R1.2, R2.1 and R2.2 to mitigate against the effects of such transients.

During circuit design, circuit designers may estimate characteristics of voltage transients that are expected to be encountered by the filter 200 (FIG. 2) and represent them as $$\frac{dV}{dt}.$$

From this estimate, the circuit designers may estimate a maximum $I_{CM}$ that may be induced by those transients. Circuit designers then may select resistance values according to a design rule:

$$R \leq \frac{1}{2}\frac{V_{DD}}{I_{CM}}, \text{ where } R = (R1.1\|R2.1).$$

In practice, a variety of resistance values may satisfy this design rule. Accordingly, circuit designers have opportunities to select resistance values that satisfy other design objectives, such as power consumption and coupling behavior of the isolator.

Figure 4:
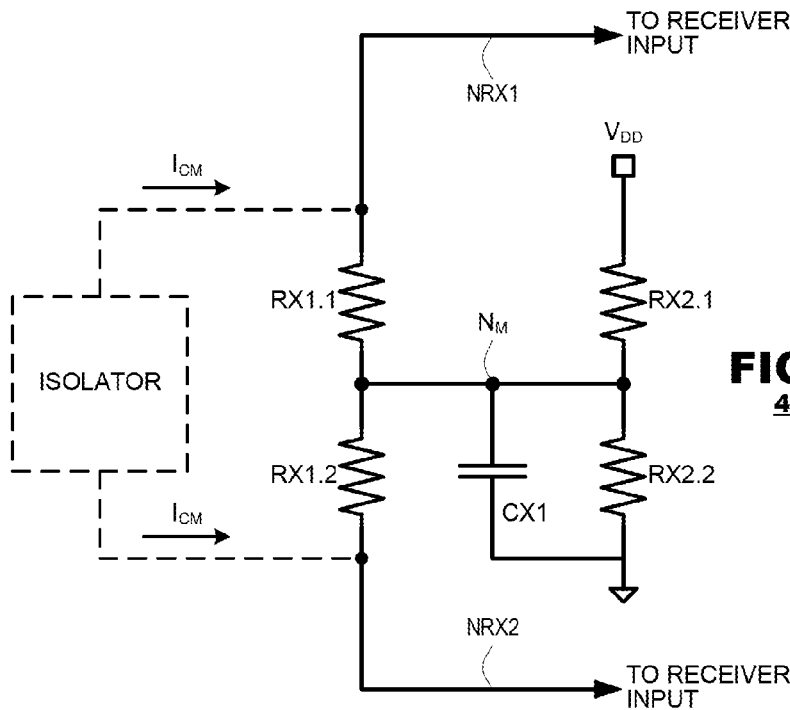
FIG. 4 illustrates an alternate filter.
Figure 5:
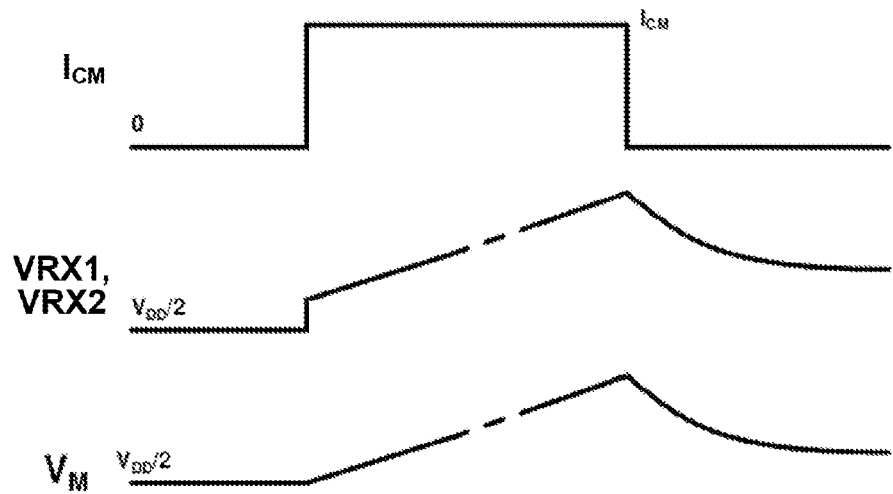
FIG. 5 illustrates exemplary waveforms representing response of the filter of FIG. 4 to a common mode transient.

FIGS. 4 and 5 illustrate operation of an alternative design for a filter in an isolator system. In this embodiment, an isolator device is coupled directly to inputs of a receiver device at nodes NRX1, NRX2. A pair of resistors RX1.1, RX1.2 may be coupled across the receiver inputs, with an intermediate node $N_M$ coupled to a capacitor CX1 and a voltage divider formed by resistors RX2.1, RX2.2.

FIG. 5 illustrates operation of the filter shown in FIG. 4 under similar circumstances as illustrated in FIG. 3. In this case, a pulse current $I_{CM}$ representing a common mode transient may cause an escalating voltage VRX1, VRX2 at the input nodes NRX1, NRX2 of the receiver. The voltage may jump immediately to a voltage of $$\frac{1}{2}V_{DD} + I_{CM}RX1.1$$

and rise at a slew rate represented by $$2\frac{I_{CM}}{CX1}.$$

As illustrated in FIG. 5, the voltage at nodes NRX1, NRX2 may reach a maximum value of $$\frac{1}{2}V_{DD} + I_{CM}RX1.1 + 2\frac{I_{CM}}{CX1}dt,$$

where dt represents the duration of the common mode transient. Therefore, in certain circumstances, the length of the common mode transient may be sufficient to cause the voltage at nodes NRX1, NRX2 to exceed the supply voltages of the receiver.

FIG. 5 also illustrates effects at an intermediate node $N_M$, which supplies the common mode reference voltage to the resistor network RX1.1, RX1.2. In this design, a common mode transient also may affect the voltage at $N_M$, causing it to rise at a slew rate of $$2\frac{I_{CM}}{CX1}.$$

Thus, as shown above, the embodiment of FIG. 2 provides increased protection to an isolation system in the presence of common mode transients.

Several embodiments of the invention are specifically illustrated and/or described herein. However, it will be appreciated that modifications and variations of the invention are covered by the above teachings and within the purview of the appended claims without departing from the spirit and intended scope of the invention. Further variations are permissible that are consistent with the principles described above.

We claim:

1. An isolator system, comprising:
   an isolator configured to generate differential isolator signals;
   a receiver configured to generate digital data representative of signals received via the isolator; and
   an RC filter coupled to the isolator and the receiver, wherein the RC filter comprises:

an input impedance stage extending between a first pair of terminals and having an intermediate node for connection to a first common mode reference voltage;

a second impedance stage extending between a second pair of terminals and having an intermediate node for connection to a second common mode reference voltage;

a voltage divider extending between a pair of supply voltages; and a capacitor having a first terminal coupled to both an intermediate node of the voltage divider and the intermediate node of the second impedance stage, and having a second terminal coupled to one of the pair of supply voltages.

2. The system of claim 1, wherein the capacitor is a first capacitor and wherein the filter further comprises a pair of second and third capacitors, each connected between a respective terminal of the input impedance stage and a respective terminal of the second impedance stage.

3. The system of claim 1, wherein the intermediate node of the voltage divider is connected to the second impedance stage as the second common mode reference voltage.

4. The system of claim 1, wherein the filter comprises:
a high pass path coupling the first pair of terminals of the filter to input terminals of the receiver.

5. The system of claim 1, wherein the isolator comprises a transformer.

6. The system of claim 1, wherein the isolator comprises a pair of capacitors.

7. The system of claim 1, wherein the isolator comprises a magneto-resistor.

8. The system of claim 1, further comprising a transmitter coupled to the isolator, wherein the transmitter is an on-off key modulator.

9. The system of claim 1, further comprising a transmitter coupled to the isolator, wherein the transmitter is a pulse-count modulator.

10. The system of claim 1, further comprising a transmitter coupled to the isolator, wherein the transmitter is a pulse-polarity modulator.

11. The system of claim 1, wherein the isolator, filter, and receiver are provided on a common substrate.

12. The system of claim 1, wherein the isolator is provided on a first substrate and the filter and the receiver are provided on a second substrate.

13. The isolator system of claim 1, wherein the second pair of terminals represents input terminals of the receiver.

14. A filter for an isolator system, comprising:
an input impedance stage extending between a first pair of terminals and having an intermediate node for connection to a first common mode reference voltage;

a second impedance stage extending between a second pair of terminals and having an intermediate node for connection to a second common mode reference voltage;

a voltage divider extending between a pair of supply voltages;

a pair of capacitors, each connected between a respective terminal of the input impedance stage and a respective terminal of the second impedance stage; and a third capacitor coupled between an intermediate node of the voltage divider and one of the pair of supply voltages.

15. The filter of claim 14, wherein the second pair of terminals are output terminals of the filter.

16. The filter of claim 14, wherein a capacitance of the third capacitor is at least twice a capacitance of each of the pair of capacitors.

17. The filter of claim 14, wherein the voltage divider comprises a pair of series-connected resistors.

18. The filter of claim 14, wherein the input impedance stage and the second impedance stage each comprise a respective pair of series-connected resistors.

19. A method, comprising:
biasing, at a first common mode voltage, a circuit path coupled between inputs of a receiver using a voltage divider extending between a pair of supply voltages;

biasing, at a second common mode voltage, a circuit path coupled between terminals coupled to an isolator producing a received isolator signal; and responsive to onset of a common mode transient signal in the received isolator signal, holding the first common mode voltage at a value between the pair of supply voltages using a capacitor coupled between an intermediate node of the voltage divider and one of the pair of supply voltages.

* * * * *